United States Patent
Matsui

(10) Patent No.: US 9,141,485 B2
(45) Date of Patent: Sep. 22, 2015

(54) STORAGE DEVICE, CONTROL DEVICE AND DATA PROTECTION METHOD

(71) Applicant: FUJITSU LIMITED, Kawasaki-shi, Kanagawa (JP)

(72) Inventor: Hideki Matsui, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 308 days.

(21) Appl. No.: 13/933,291

(22) Filed: Jul. 2, 2013

(65) Prior Publication Data

US 2014/0040677 A1 Feb. 6, 2014

(30) Foreign Application Priority Data

Aug. 2, 2012 (JP) ................. 2012-172268

(51) Int. Cl.
| | |
|---|---|
| *G06F 11/08* | (2006.01) |
| *G06F 11/16* | (2006.01) |
| *G06F 11/10* | (2006.01) |
| *G06F 3/06* | (2006.01) |

(52) U.S. Cl.
CPC ............ *G06F 11/1666* (2013.01); *G06F 11/10* (2013.01); *G06F 3/0611* (2013.01); *G06F 3/0619* (2013.01); *G06F 3/0689* (2013.01)

(58) Field of Classification Search
CPC .................... G06F 11/1666; G06F 2212/1032
USPC ......................... 714/6.1, 6.11, 6.24
See application file for complete search history.

(56) References Cited

U.S. PATENT DOCUMENTS

| | | | | |
|---|---|---|---|---|
| 2009/0241010 | A1* | 9/2009 | Yano et al. ..................... | 714/764 |
| 2009/0282321 | A1* | 11/2009 | Nikazm et al. ................ | 714/799 |
| 2012/0290897 | A1* | 11/2012 | Yoon et al. ..................... | 714/766 |
| 2013/0024735 | A1* | 1/2013 | Chung et al. .................. | 714/704 |
| 2013/0042164 | A1* | 2/2013 | Suzuki et al. ................. | 714/773 |
| 2014/0281801 | A1* | 9/2014 | Meir et al. ..................... | 714/763 |

FOREIGN PATENT DOCUMENTS

| | | |
|---|---|---|
| JP | 9-288619 | 11/1997 |
| JP | 2008-158779 | 7/2008 |

* cited by examiner

*Primary Examiner* — Chae Ko
(74) *Attorney, Agent, or Firm* — Staas & Halsey LLP

(57) ABSTRACT

A storage device includes one or more storages and one or more control devices to control writing data to and reading data from one of the storages. Each of the control devices includes a memory, a memory controller, and a processor. The memory controller controls writing data to and reading data from the memory. The processor determines whether the memory and the memory controller have error correcting functions respectively. The processor determines, when at least one of the memory and the memory controller does not have an error correcting function, whether an error is detected in first data expanded in a first memory region of the memory. The first data includes an error detecting code. The processor saves, when no error in the first data has been detected, the first data into a second memory region of the memory. The second memory region is different from the first memory region.

8 Claims, 9 Drawing Sheets

STORAGE DEVICE, CONTROL DEVICE AND DATA PROTECTION METHOD

CROSS-REFERENCE TO RELATED APPLICATION

This application is based upon and claims the benefit of priority of the prior Japanese Patent Application No. 2012-172268, filed on Aug. 2, 2012, the entire contents of which are incorporated herein by reference.

FIELD

The embodiments discussed herein are related to a storage device, a control device, and a data protection method.

BACKGROUND

Upon receiving a data write request from a host, a storage device notifies the host that the data has been received properly and writes the received data to a disk. If the data has not been received properly, the storage device notifies the host that the data has not been received properly and then receives the same data again from the host. The host that has received from the storage device the notification, notifying that the data has been properly received, erases the held data and uses the resources, used for holding the data, for different work. Therefore, the storage device is requested to notify, as quickly as possible, the host that the reception of the data has been completed and also requested to properly write the data.

As a result, the storage device is designed to be able to quickly notify the host that the reception of data has been completed. For example, the storage device writes the received data once in a memory upon receiving the data from the host. Then, the storage device notifies the host that the reception has been completed before actually writing the data to the disk. Thus storage devices are often equipped with a memory having an error detecting and correcting function with which data corruption is detected by the memory and corrected. The error detecting and correcting function may be based on an error-correcting code (ECC) for example.

Japanese Laid-Open Patent Publications No. H09-288619 and No. 2008-158779 disclose related techniques.
Problems However, there is a problem in that the data to be written may be lost if the memory and the memory controller are not equipped with an error detecting and correcting function.

The problem of the loss of the data to be written is described in detail with reference to FIGS. 8 and 9. In FIGS. 8 and 9, the memory is described as a dual inline memory module (DIMM) and the error detecting and correcting function is described as ECC. FIG. 8 describes a process of writing to a disk when the DIMM is ECC-compatible. FIG. 9 describes a process of writing to a disk when the DIMM is not ECC-compatible.

As illustrated in FIG. 8, a storage device 900 includes controller modules (CMs) CM#0 to CM#3. CM#0 and CM#1 are redundant, CM#2 and CM#3 are redundant, and CM#0 to CM#3 are interconnected through a peripheral component interconnect express (PCIe) switch. CM#0 and CM#3 are each connected to a host. CM#0 to CM#3 each has a central processing unit (CPU) 910, DIMMs 920, and a memory controller 930. Furthermore, CM#0 to CM#3 each has channel adapters (CAs) 940, disk interfaces (DIs) 950, direct memory access (DMA) chips 960, and a PCIe switch 970. The DIMMs 920 are ECC-compatible memory modules. The memory controller 930 is an ECC-compatible controller and controls the DIMMs 920. The CAs 940 are interfaces with a host. The DIs 950 are interfaces with a disk. The DMA chips 960 are DMA interfaces between the CMs. DMA is a data transfer protocol for directly transferring data without involving the CPU 910. The PCIe switch 970 connects the memory controller 930, the CAs 940, the DIs 950, and the DMA chips 960 as input/output (I/O) devices.

When the storage device 900 has received, from a host, a write request to a disk area managed by CM#0 and CM#1, the writing process is conducted as described below. First, a CA 940 in CM#3 that has received the data write request from the host transfers the data to be written to a DIMM 920 using a DMA function and expands the transferred data in the DIMM 920 (O31 in FIG. 8). If an error detecting code, for example, a cyclic redundancy check (CRC), has not been added to the data at this time, the CA 940 then transfers the data to the DIMM 920 after adding an error detecting code to the data. Even if data corruption is detected, the data corruption is automatically corrected by the DIMM 920 since the DIMM 920 is ECC-compatible.

Then, when the CA 940 notifies the CPU 910 that the data transfer has been completed, the CPU 910 notifies the host that reception of the data has been completed (O32 in FIG. 8). The data to be written is then erased on the host side.

The CPU 910 then requests a DMA chip 960 to transfer the data to CM#0 and CM#1 managing the disk. The DMA chip 960 transfers the data to DIMMs 920 in CM#0 and CM#1 and expands the data in the respective DIMMs 920 (O33 in FIG. 8). Even if data corruption is detected, the data corruption is automatically corrected by the DIMM 920 since the DIMM 920 is ECC-compatible.

A DI 950 then reads the data from the DIMM 920, checks for errors in the read data, and writes the data to the disk if there are no errors. Even if there is an error, the DI 950 is able to write the correct data to the disk by reading the data again from the DIMM 920 (O34 in FIG. 8).

A process of writing to a disk when the DIMM is not ECC-compatible will be described with reference to FIG. 9. DIMMs 920A are non-ECC-compatible memory modules. As illustrated in FIG. 9, after a data write request is output by a host, a CA 940 in CM#3 first transfers the data to be written to a DIMM 920A using a DMA function and expands the transferred data in the DIMM 920A (O31 in FIG. 9). If an error detecting code, a CRC for example, has not been added to the data, the CA 940 then transfers the data to the DIMM 920A after adding an error detecting code to the data. Even if data corruption is detected, the data corruption is not automatically corrected since the DIMM 920A is not ECC-compatible and thus the data remains corrupted.

Then, when the CA 940 notifies the CPU 910 that the data transfer has been completed, the CPU 910 notifies the host that reception of the data has been completed (O32 in FIG. 9). The data to be written is then erased on the host side.

The CPU 910 then requests a DMA chip 960 to transfer the data to CM#0 and CM#1 managing the disk. The DMA chip 960 transfers the data to the DIMMs 920A in CM#0 and CM#1 and expands the data in the respective DIMMs 920A (O33 in FIG. 9). Even if data corruption is detected, the data corruption is not automatically corrected since the DIMM 920A is not ECC-compatible.

A DI 950 then reads the data from the DIMM 920A, checks for errors in the read data, and writes the data to the disk if there are no errors (O34 in FIG. 9). However, when there is an error, an error may occur again in the check even if the DI 950 reads the corrupted data again from the DIMM 920A in CM#0. Similarly, an error may occur again in the check even if the DI 950 reads the corrupted data again from the DIMM 920A in CM#3. Consequently, the data is lost since the data has already been erased on the host side.

SUMMARY

According to an aspect of the present invention, provided is a storage device including one or more storages and one or more control devices to control writing data to and reading data from one of the storages. Each of the control devices includes a memory, a memory controller, and a processor. The memory controller controls writing data to and reading data from the memory. The processor determines whether the memory and the memory controller have error correcting functions respectively. The processor determines, when at least one of the memory and the memory controller does not have an error correcting function, whether an error is detected in first data expanded in a first memory region of the memory. The first data includes an error detecting code. The processor saves, when no error in the first data has been detected, the first data into a second memory region of the memory. The second memory region is different from the first memory region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments of a storage device, a control device, and a data protection method will be described in detail with reference to the drawings. Embodiments are not limited to the embodiments described herein. The embodiments may be combined within the limitations of consistency of the contents of the processing.

First Embodiment

Configuration of Storage Device

Figure 1:
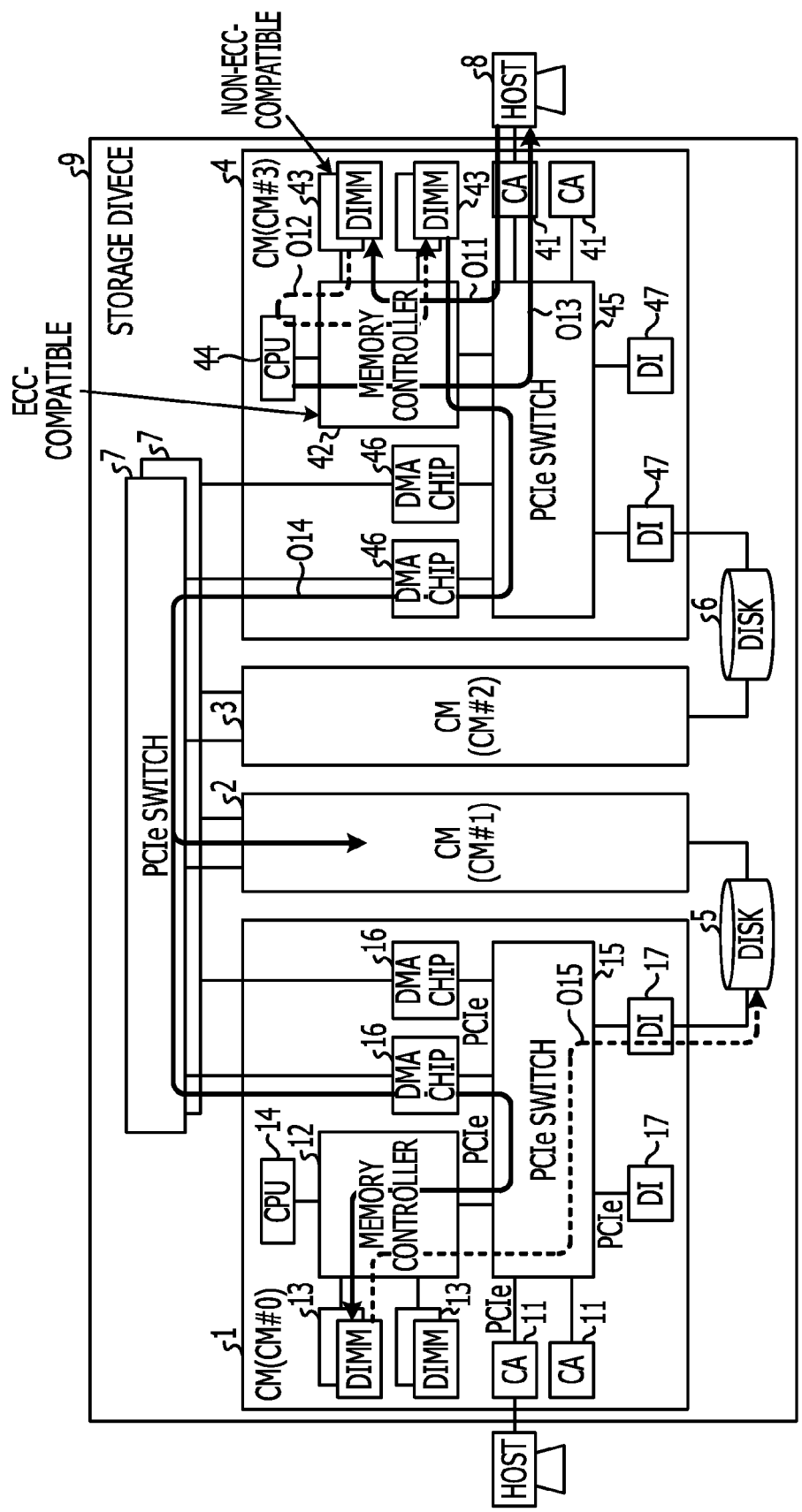
FIG. 1 illustrates a hardware configuration of a storage device according to a first embodiment.

FIG. 1 illustrates a hardware configuration of a storage device according to a first embodiment. As illustrated in FIG. 1, a storage device 9 includes CMs 1 to 4, disks 5 and 6, and a PCIe switch 7. The CMs 1 to 4 are interconnected through the PCIe switch 7. The CMs 1 and 2 are connected with the disk 5 and render data redundant. The CMs 3 and 4 are connected with the disk 6 and render data redundant. The CM 4 is connected with a host 8 that is a host computer such as a server and the like. A writing operation when the CM 4 receives from the host 8 a write request to write data to the disk 5 managed by the CMs 1 and 2 will be mainly described below. The CM 4 is an example of a "first control device," the CM 1 is an example of a "second control device," and the CM 2 is an example of a "third control device."

The CM 4 includes CAs 41, a memory controller 42, DIMMs 43, a CPU 44, a PCIe switch 45, DMA chips 46, and DIs 47. A description of the CM 3 will be omitted since the configuration thereof is similar to that of the CM 4.

The CA 41 is an interface with a host. For example, upon receiving from the host 8 a write request to write data to the disk 5 managed by the CMs 1 and 2, the CA 41 writes the data to the DIMM 43 through the memory controller 42 (O11 in FIG. 1). Specifically, the CA 41 expands the data in the DIMM 43 with a data transfer protocol based on DMA. If an error detecting code has not been added to the data when writing the data to the DIMM 43, the CA 41 transfers the data to the DIMM 43 after adding an error detecting code to the data. After completing the transfer of the data to the DIMM 43, the CA 41 notifies the CPU 44 (described later) that the data transfer has been completed. The error detecting code added to the data is CRC in this example, but is not limited to CRC.

The memory controller 42 is an ECC-compatible controller and conducts I/O control of data to the DIMM 43 (described later). Even if data corruption is detected in the data, the data corruption is automatically corrected in the memory controller 42 since the memory controller 42 is ECC-compatible. ECC compatibility may be determined according to a register value provided therein. For example, the register value is set to "1" for ECC-compatible, and the register value is set to "0" for non-ECC-compatible.

The DIMM 43 is a non-ECC-compatible memory module. Even if data corruption is detected, the data corruption is not automatically corrected since the DIMM 43 is not ECC-compatible and thus the data remains corrupted. For example, the DIMM 43 holds the data in a corrupted state when the data is corrupted when written by the CA 41. ECC compatibility may be determined according to serial presence detect (SPD) information provided therein.

The CPU 44 has an internal memory for storing control data and programs that specify various operating procedures, and the CPU 44 performs various types of processing in accordance with the programs and the control data. As an example, the CPU 44 checks the CRC of transferred data upon receiving from the CA 41 a notification that the data transfer to the DIMM 43 has been completed. The CPU 44 copies the data to another region of the DIMMs 43 if data corruption has not been detected in the data (O12 in FIG. 1). The copying of the data to another region is conducted to protect normal data in which data corruption has not been detected to reduce the loss of the data to be written.

The CPU 44 also transmits a reception completion notification to the host 8 (O13 in FIG. 1). As a result, the CPU 44 is able to transmit the reception completion notification to the host 8 as quickly as possible so that the data may be erased on the host 8 side and the resources used for holding the data may be used for other work. The CPU 44 then sends to the DMA chip 46 (described later), through the PCIe switch 45, a request for transferring the data to the CM 1 and the CM 2 that are the data writing destinations. The CPU 44 requests the host 8 to resend the data if data corruption in the data has been detected as a result of the CRC check.

The PCIe switch 45 connects the CAs 41, the memory controller 42, the DMA chips 46, and DIs 47 as I/O devices and relays data between the I/O devices.

The DMA chip 46 is a controller for DMA between the CMs. For example, the DMA chip 46 transfers the data to the DIMM in the CM 1 to which the data writing has been requested. Moreover, the DMA chip 46 transfers the data to the DIMM in the CM 2 that is rendered redundant with the CM 1 to which the data writing has been requested (O14 in FIG. 1). This transfer is for mirroring the data in case of a breakdown in the CM 1. The DMA chip 46 notifies the CPU 44 in the CM 4 and the CPUs in the CM 1 and CM 2 that are the transfer destinations upon completing the transfer of the data to the DIMMs. As a result, the region for the transferred data in the DIMM 43 may be cleared. While the transferred data is, for example, data in the DIMM 43 as a protection source, the data may also be data in the DIMM 43 as a protection destination.

The DI 47 is an interface with the disk 6.

The CM 1 includes CAs 11, a memory controller 12, DIMMs 13, a CPU 14, a PCIe switch 15, DMA chips 16, and DIs 17. A description of the CM 2 will be omitted since the configuration thereof is the same as that of the CM 1.

The CA 11 is an interface with a host.

The memory controller 12 conducts I/O control of data to the DIMM 13 (described later). While the memory controller 12 is an ECC-compatible controller in this example, the memory controller 12 may be a non-ECC-compatible controller. ECC compatibility may be determined according to a register value provided therein. For example, the register value is set to "1" for ECC-compatible, and the register value is set to "0" for non-ECC-compatible.

The DIMM 13 is a memory module. While the DIMM 13 is a non-ECC-compatible DIMM in this example, the DIMM 13 may be an ECC-compatible DIMM. Even if data corruption is detected, the data corruption is not automatically corrected since the DIMM 13 is not ECC-compatible and thus the data remains corrupted. If the DIMM 13 is ECC-compatible, the data corruption is automatically corrected when data corruption is detected. ECC compatibility may be determined according to SPD information provided therein.

The CPU 14 has an internal memory for storing control data and programs that specify various operating procedures, and the CPU 14 performs various types of processing in accordance with the programs and the control data. As an example, the CPU 14 requests the DI 17 (described later) to write the data to the disk 5 upon receiving from the DMA chip 46 in the CM 4 a notification that the data transfer to the DIMM 13 has been completed. The CPU 14 requests the CM 2 that is redundant with the CM of the CPU 14 to write the mirrored data upon being notified by the DI 17 that an error has occurred in the data writing. As a result, the CPU 14 is able to complete the writing to the disk 5 using the data mirrored in the CM 2 even if an error occurs in the data writing. Moreover, the CPU 14 requests the CPU 44 in the CM 4 to write copied data of the data upon being notified by the CM 2 that an error has occurred in the data writing. As a result, the CPU 14 is able to complete the writing to the disk 5 using the copied data even if an error occurs in the data writing.

The DI 17 is an interface with the disk 5. For example, the DI 17 reads the data to be written from the DIMM 13 upon receiving the write request from the CPU 14 and checks the CRC of the read data. The DI 17 writes the data to the disk 5 if data corruption is has not been detected in the read data (O15 in FIG. 1). Conversely, the DI 17 notifies the CPU 14 that an error has occurred if data corruption has been detected in the read data. An example of a timing in which the data becomes corrupted is a timing at which the data is written to the DIMM 13 when the DIMM 13 in the CM 1 is not ECC-compatible. Further, another example of a timing in which the data becomes corrupted is while flowing inside the transmission line before the DIMM 13 or inside the transmission line from the DIMM 13 to the DI 17.

Flow Chart of Writing Process

Figure 2:
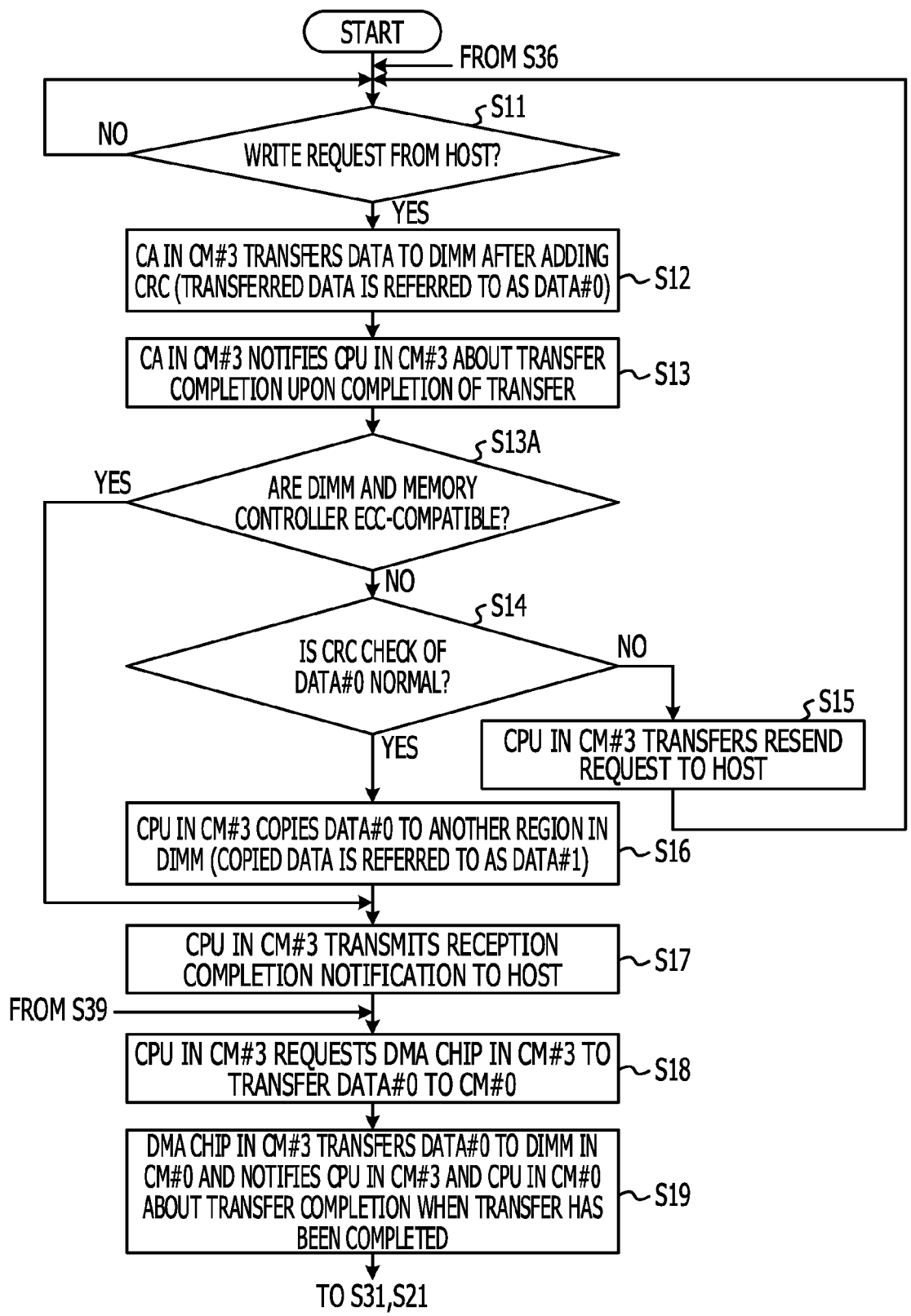
FIG. 2 is a flow chart of writing process by a storage device according to a first embodiment.
Figure 3:
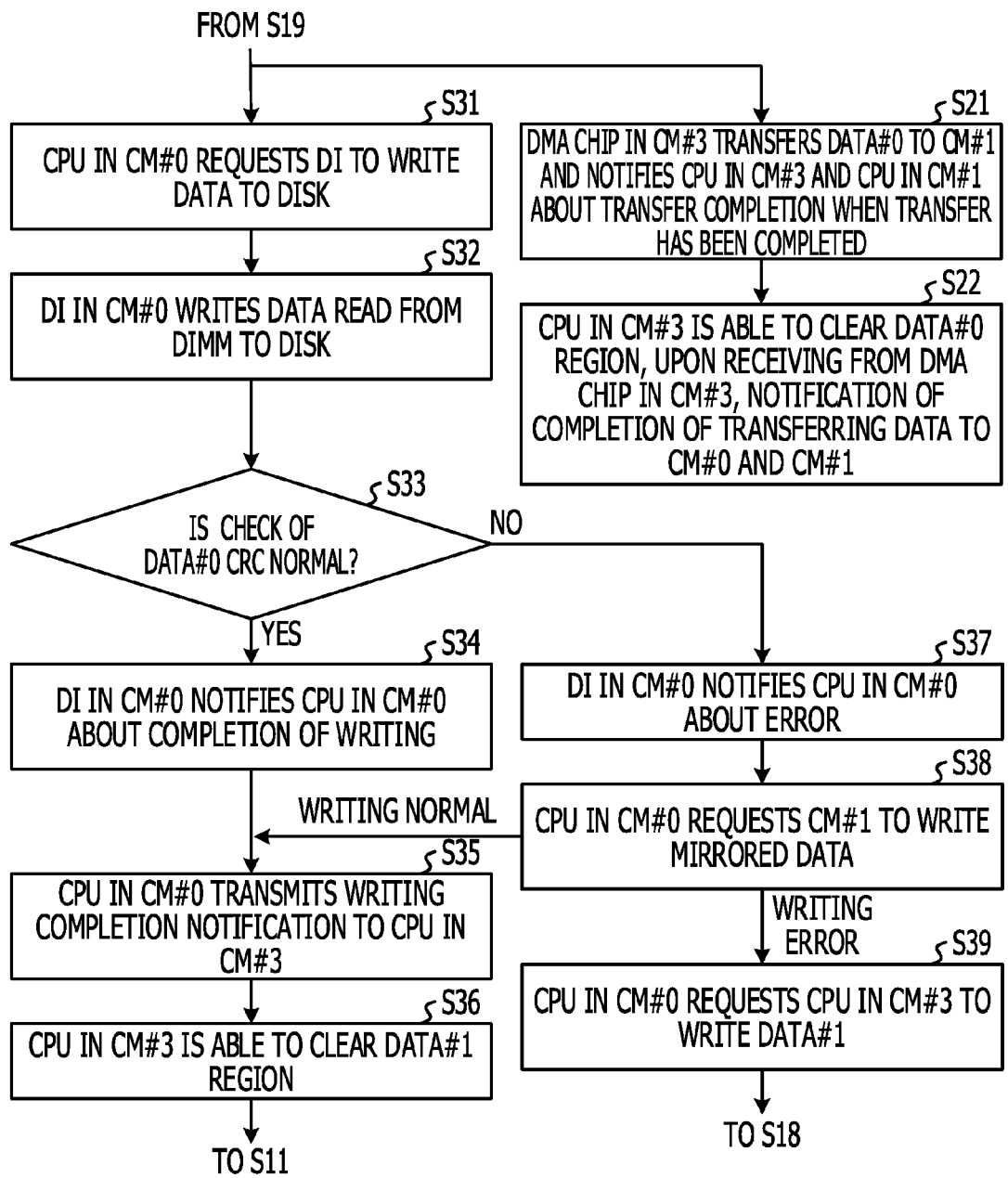
FIG. 3 is a flow chart of writing process by a storage device according to a first embodiment.

A flow chart of writing process in the storage device 9 according to the first embodiment will be described next with reference to FIGS. 2 and 3. FIGS. 2 and 3 illustrate a flow chart of writing process by the storage device according to the first embodiment. The CM 1 is described as CM#0, the CM 2 is described as CM#1, the CM 3 is described as CM#2, and the CM 4 is described as CM#3 in FIGS. 2 and 3. It is assumed that CM#3 receives from the host 8 a write request to write data to the disk 5 managed by CM#0 and CM#1.

First, a determination is made in CM#3 as to whether the CA 41 has received a write request from the host 8 (S11). When it is determined that no write request has been received from the host 8 (S11: No), the determination process is repeated until the CA 41 receives a write request.

When it is determined that a write request from the host 8 has been received (S11: Yes), the CA 41 transfers the data to be written to the DIMM 43 (S12). If a CRC has not been added to the data to be written, the CA 41 adds a CRC to the data before transferring the data to the DIMM 43. For ease of description, the data transferred to the DIMM 43 is referred to as Data#0. The CA 41 then notifies the CPU 44 in CM#3 that the transfer has been completed upon completion of the transfer (S13).

The CPU 44 in CM#3 determines whether the DIMM 43 and the memory controller 42 are ECC-compatible (S13A). For example, the CPU 44 determines whether the DIMM 43 is ECC-compatible using SPD information. The CPU 44 also determines whether the memory controller 42 is ECC-compatible using the register provided therein. When it is determined that the DIMM 43 and the memory controller 42 are ECC-compatible (S13A: YES), the CPU 44 does not check the CRC and the routine moves to S17. Conversely, when it is determined that one of the DIMM 43 or the memory controller 42 is not ECC-compatible (S13A: No), the routine moves to S14 in which the CPU 44 checks the CRC.

In S14, the CPU 44 in CM#3 checks the CRC of Data#0 to determine if the CRC check is normal (S14). When it is determined that the CRC check is not normal (S14: No), the CPU 44 transmits a request to the host 8 to resend the data (S15). The data may be corrupted for example if the CRC check is not normal. The writing process routine then moves to S11.

Conversely, when it is determined that the CRC check is normal (S14: Yes), the CPU 44 copies Data#0 to another region of the DIMMs 43 (S16). The copying of the data to another region is conducted to protect data in which data corruption has not been detected. For ease of description, the data transferred to the other region is referred to as Data#1. Thereafter, the CPU 44 transmits a reception completion notification to the host 8 (S17).

The CPU 44 in CM#3 requests the DMA chip 46 in CM#3 to transfer Data#0 to CM#0 (S18). The DMA chip 46 transfers Data#0 to the DIMM 13 in CM#0 and notifies the CPU 44 in CM#3 and the CPU 14 in CM#0 that the transfer has been completed after the completion of the transfer (S19).

The DMA chip 46 then transfers Data#0 to CM#1 that is redundant with CM#0 and notifies, after the completion of the transfer, the CPU 44 in CM#3 and the CPU in CM#1 that the transfer has been completed (S21). The CPU 44 in CM#3 is able to clear the region for Data#0 upon receiving, from the DMA chip 46 in CM#3, the notification that the transfer to CM#0 and CM#1 has been completed (S22).

The CPU 14 in CM#0 that has received the transfer completion notification from the DMA chip 46 requests the DI 17 to write the transferred Data#0 to the disk 5 (S31). The DI 17 then reads Data#0 from the DIMM 13 and writes the read Data#0 to the disk 5 (S32).

The DI 17 checks the CRC of Data#0 to determine if the CRC check is normal (S33). When it is determined that the CRC check is normal (S33: Yes), the DI 17 notifies the CPU 14 that the writing has been completed (S34). The CPU 14 then transmits a writing completion notification to the CPU 44 in CM#3 (S35).

In CM#3, the CPU 44 is able to clear the region of Data#1 upon receiving the writing completion notification from the CPU 14 in CM#0 since the writing of the data in the write request has been completed (S36). The routine moves to S11, and the writing process waits for the next write request.

When it is determined in S33 that the CRC check is not normal (S33: No), the DI 17 notifies the CPU 14 in CM#0 about the error (S37). The CPU 14 in CM#0 then requests CM#1 to write the mirrored data (S38). The routine moves to S35, and the CPU 14 in CM#0 notifies CM#3 about the completion of the writing upon receiving the notification from CM#1 that the writing is normal.

Conversely, upon receiving notification from CM#1 that an error has occurred in the writing, the CPU 14 in CM#0 requests the CPU 44 in CM#3 to write the copied Data#1 (S39). The routine moves to S18 and the processing conducted using Data#0 is conducted using Data#1 in place of Data#0.

The memory controller 42 has been described as ECC-compatible and the DIMM 43 has been described as not ECC-compatible in the storage device 9 according to the first embodiment. However, the memory controller 42 may be non-ECC-compatible and the DIMM 43 may be ECC-compatible, or both the memory controller 42 and the DIMM 43 may be non-ECC-compatible in the storage device 9. That is, the first embodiment may be applied to a case in which the data is not automatically corrected if an error occurs in the data.

The above description describes a case in which the memory controller 42 is not embedded in the CPU 44 in the storage device according to the first embodiment. However, without being limited as such, the memory controller 42 may be embedded inside the CPU 44 in the storage device 9. A description will now be provided of a case in which the memory controller 42 is embedded in the CPU 44, as a modified example of the storage device 9 according to the first embodiment.

Configuration of Modified Example of Storage Device

Figure 4:
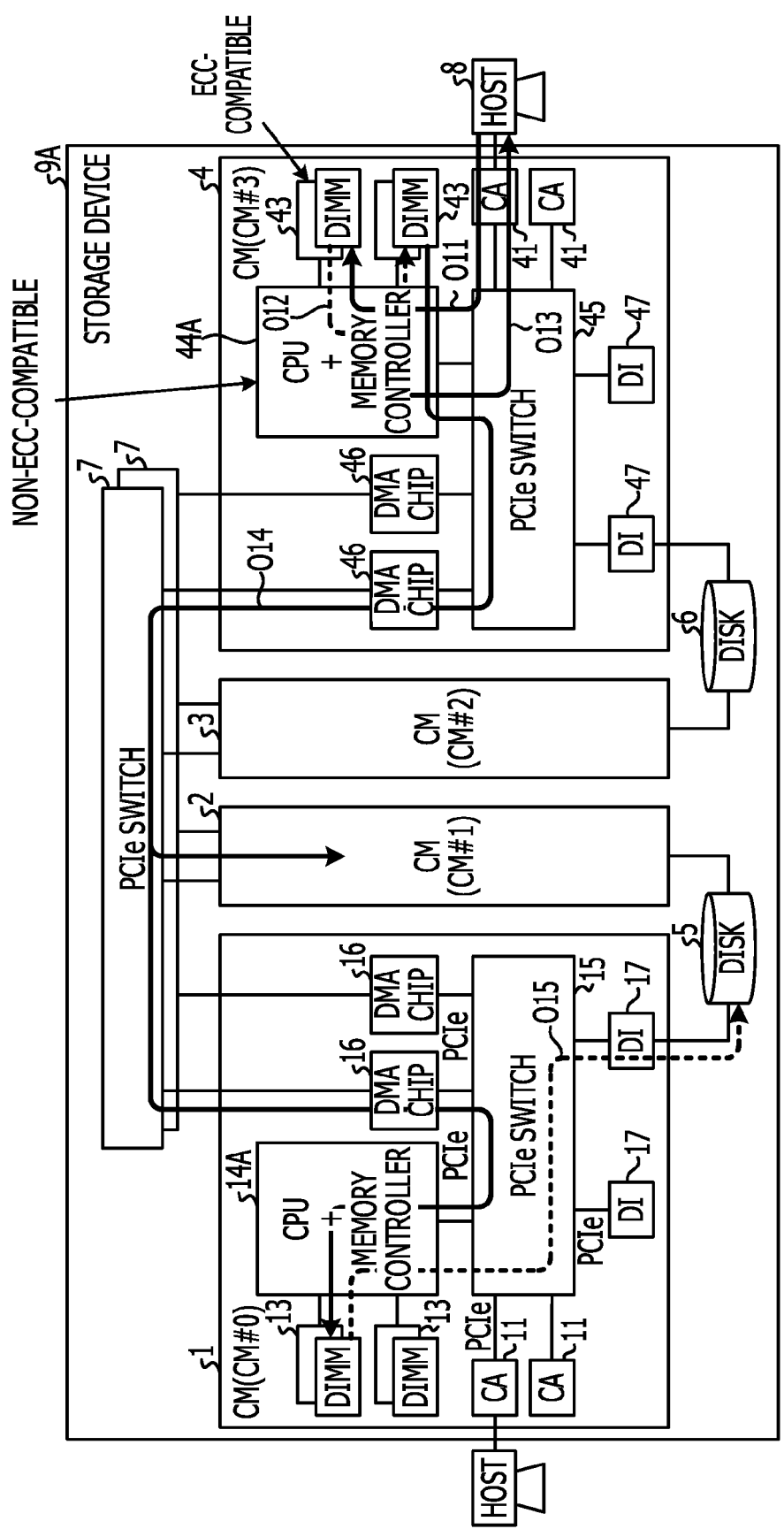
FIG. 4 illustrates a modified example of a hardware configuration of a storage device according to a first embodiment.

FIG. 4 illustrates a hardware configuration of a modified example of a storage device according to the first embodiment. Components similar to those of the storage device illustrated in FIG. 1 are illustrated with similar reference numerals, and a description of similar configurations and operations will be omitted. The difference between FIGS. 1 and 4 is that the memory controller 42 and the CPU 44 in the CM 4 are changed to a CPU+memory controller 44A. The memory controller 12 and the CPU 14 in the CM 1 are changed to a CPU+memory controller 14A.

The DIMM 43 is an ECC-compatible memory module. ECC-compatibility may be determined according to SPD information provided therein.

The CPU+memory controller 44A is a CPU with an embedded memory controller and includes controlling the DIMM 43 as one function. The CPU+memory controller 44A is non-ECC-compatible as an example. ECC-compatibility may be determined according to a register value provided therein.

The CPU+memory controller 44A has an internal memory for storing control data and programs that specify various operating procedures, and the CPU+memory controller 44A performs, as another function, various types of processing in accordance with the programs and the control data. As an example, the CPU+memory controller 44A checks the CRC of data upon receiving from the CA 41 a notification that the transfer of the data to the DIMM 43 has been completed. The CPU+memory controller 44A copies the data to another region of the DIMMs 43 if data corruption has not been detected in the data (O12 in FIG. 4). The copying of the data to another region is conducted to protect normal data in which data corruption has not been detected to reduce the loss of the data to be written.

The CPU+memory controller 44A also transmits a reception completion notification to the host 8 (O13 in FIG. 4). As a result, the CPU+memory controller 44A is able to transmit the reception completion notification to the host 8 as quickly as possible so that the data may be erased on the host 8 side and the resources used for holding the data may be used for other work.

The CPU+memory controller 44A then sends to the DMA chip 46, through the PCIe switch 45, a request for transferring the data to CM#0 and CM#1 that are the data writing destinations. The CPU+memory controller 44A requests the host 8 to resend the data if data corruption in the data has been detected.

The CPU+memory controller 14A is a CPU with an embedded memory controller and includes controlling the DIMM 13 as one function. While the CPU+memory controller 14A is ECC-compatible as an example, the CPU+memory controller 14A may be non-ECC-compatible. ECC-compatibility may be determined according to a register value provided therein.

The CPU+memory controller 14A has an internal memory for storing control data and programs that specify various operating procedures, and the CPU+memory controller 14A performs, as another function, various types of processing in accordance with the programs and the control data. As an example, the CPU+memory controller 14A requests the DI 17 to write the data to the disk 5 upon receiving from the DMA chip 46 in the CM 4 a notification that the data transfer to the DIMM 13 has been completed. The CPU+memory controller 14A requests the CM 2 that is redundant with the CM of the CPU+memory controller 14A to write the mirrored data upon being notified by the DI 17 that an error has occurred in the data writing. As a result, the CPU+memory controller 14A is able to complete the writing to the disk 5 using the data mirrored in the CM 2 even if an error occurs in the data writing. Moreover, the CPU+memory controller 14A requests the CPU+memory controller 44A in the CM 4 to write copied data of the data upon being notified by the CM 2 that an error has occurred in the data writing. As a result, the CPU+memory controller 14A is able to complete the writing to the disk 5 using the copied data even if an error occurs in the data writing.

The flow chart of the writing process for the modified example is similar to that explained with reference to FIGS. 2 and 3 and any further description will be omitted. However, the CPU 44 and the memory controller 42 may be replaced with the CPU+memory controller 44A, and the CPU 14 and the memory controller 12 may be replaced with the CPU+memory controller 14A.

Effects of First Embodiment

According to the above first embodiment, when at least one of the DIMM 43 and the memory controller 42 is non-ECC-compatible in the storage device 9, the CM 4 receives a write request from the host 8 to write data to the storage managed by the CM 1 and the CM 2. The CM 4 expands the data to be written, to which the CRC is added, in the DIMM 43 through the memory controller 42 and determines whether an error has been detected in the expanded data. The CM 4 saves the data into a region different from the region of the DIMM 43 in which the data has been expanded when it is determined that an error in the data has not been detected. The CM 4 then notifies the host 8 about the completion of the writing after the saving of the data to be written has been completed. According to such a configuration, the data to be written is expanded in the DIMM 43 and data without an error is saved even if either one of the DIMM 43 or the memory controller 42 is not ECC-compatible. As a result, the storage device 9 is able to reduce the loss of the data to be written until the writing to the disk 5 has been completed even if the notification that the writing has been completed is sent to the host 8.

According to the above first embodiment, the CM 4 transfers the data expanded in the DIMM 43 to the DIMM in the CM 1 and the DIMM in the CM 2 that is redundant with the CM 1. The CM 1 then further determines whether an error has been detected in the data when writing, to the disk 5, the data transferred to the DIMM 13. The CM 1 then requests the CM 2 to write the transferred data when it is determined that an error has been detected. The CM 1 then writes the data in which no error has been detected to the disk 5 if it is determined that no error has been detected. In such a configuration, the storage device 9 is able to properly complete writing to the disk 5 by using the data transferred to the CM 2 that is redundant with the CM 1 for the writing to the disk 5 even if an error is detected in the data by the CM 1.

According to the above first embodiment, when the CM 1 receives notification that the data writing requested to the CM 2 has failed, the CM 1 requests the CM 4 to transfer the data saved by the CM 4, so as to write the saved data. According to such a configuration, the storage device 9 is able to properly complete writing to the disk 5 by using the saved data even if the data writing by the CM 2 has failed.

Second Embodiment

In the storage device 9 according to the first embodiment, the data to be written is copied to a DIMM when a data write request is made if at least one of the DIMM or a memory controller is not ECC-compatible. However, the storage device 9 is not limited as such, and data to be read may be copied to a DIMM when a data read request is made in addition to a write request if at least one of the DIMM or the memory controller is not ECC-compatible. Accordingly, a description is provided of a storage device for copying data to be read to a DIMM when a read request is made in addition to a write request when at least one of the DIMM and the memory controller is not ECC-compatible.

Configuration of Storage Device

Figure 5:
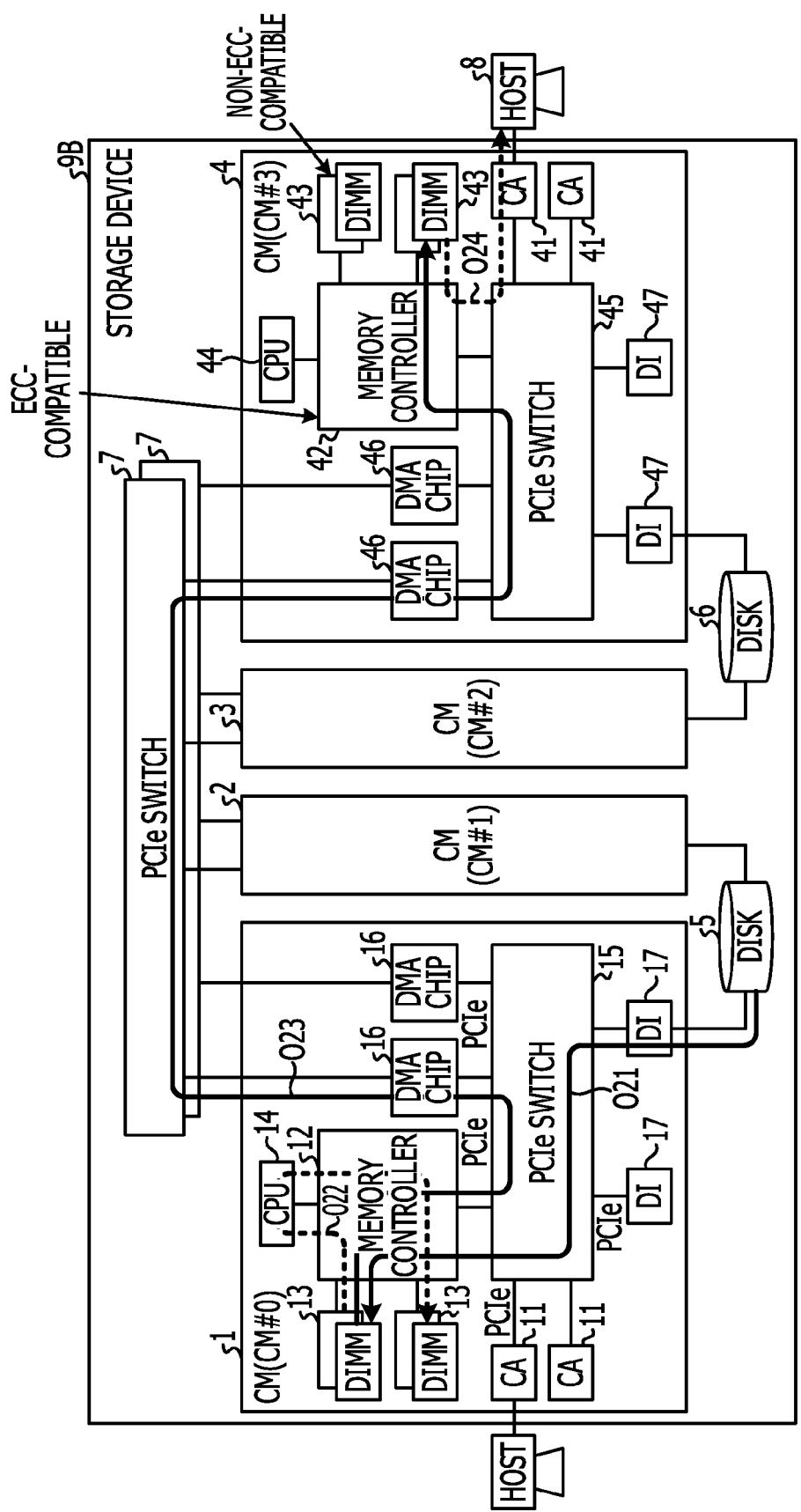
FIG. 5 illustrates a hardware configuration of a storage device according to a second embodiment.

FIG. 5 illustrates a hardware configuration of a storage device according to a second embodiment. Components similar to those of the storage device illustrated in FIG. 1 are illustrated with similar reference numerals, and descriptions of similar configurations and operations will be omitted. The description of the writing operation when the CM 4 receives from the host 8 a write request to write data to the disk 5 managed by the CMs 1 and 2 will be omitted. The following description will focus on a reading operation when the CM 4 receives from the host 8 a read request to read data from the disk 5 managed by the CMs 1 and 2.

The CPU 14 requests the DI 17 to read data from the disk 5 upon receiving a read request from the CM 4. The CPU 14 checks the CRC of the data upon receiving, from the DI 17, the notification that the data transfer to the DIMM 13 has been completed. The CPU 14 copies the data to another region of the DIMMs 13 if data corruption has not been detected in the data (O22 in FIG. 5). The copying of the data to another region is conducted to protect normal data in which data corruption has not been detected. The CPU 14 then sends a request through the PCIe switch 15 to the DMA chip 16 to transfer the data to the CM 4 that is connected to the host 8. The CPU 14 requests the DI 17 to resend the data if data corruption in the data has been detected.

The DMA chip 16 transfers the data to the DIMM 43 in the CM 4 connected to the host 8 upon receiving the data transfer request from the CPU 14 (O23 in FIG. 5). The DMA chip 16 notifies the CPU 14 in the CM 1 and the CPU 44 in the CM 4 which is the transfer destination that the data transfer has been completed upon the completion of the transfer of the data to the DIMM 43. As a result, the region of the transferred data in the DIMM 13 may be cleared. While the transferred data is, for example, data in the DIMM 13 as a protection source, the data may also be data in the DIMM 13 as a protection destination.

The DI 17 reads data from the disk 5 in accordance with the read request upon receiving the data read request from the CPU 14. The DI 17 then writes the data to the DIMM 13 through the memory controller 12 (O21 in FIG. 5). If an error detecting code has not been added to the data when writing the data to the DIMM 13, the DI 17 adds an error detecting code to the data before transferring the data to the DIMM 13. The DI 17 notifies the CPU 14 that the data transfer to the DIMM 13 has been completed upon completing the transfer of the data to the DIMM 13. The error detecting code added to the data is CRC in this example, but is not limited to CRC.

The CA 41 reads the data to be transferred from the DIMM 43 upon receiving the transfer request from the CPU 44 and checks the CRC of the read data. The CA 41 passes the data to the host 8 if data corruption has not been detected in the read data (O24 in FIG. 5). As a result, the processing for the read request from the host 8 has been completed. Conversely, the CA 41 notifies the CPU 44 that an error has occurred if data corruption has been detected in the read data. The timing at which the data is written to the DIMM 43 is an example of a timing at which the data becomes corrupted. Further, another example of a timing in which the data becomes corrupted is while flowing inside the transmission line before being written to the DIMM 43 or inside the transmission line from the DIMM 43 to the CA 41.

The CPU 44 requests the CA 41 to transfer the data to the host 8 upon receiving from the DMA chip 16 in the CM 1 the notification that the transfer of the data has been completed. Moreover, the CPU 44 requests the CPU 14 in the CM 1 to resend the copied data of the data upon being notified by the CA 41 that an error has occurred in the data transfer. As a result, the CPU 44 is able to complete the transfer to the host 8 using the copied data even if the data to be transferred is corrupted.

Flow Chart of Reading process

Figure 6:
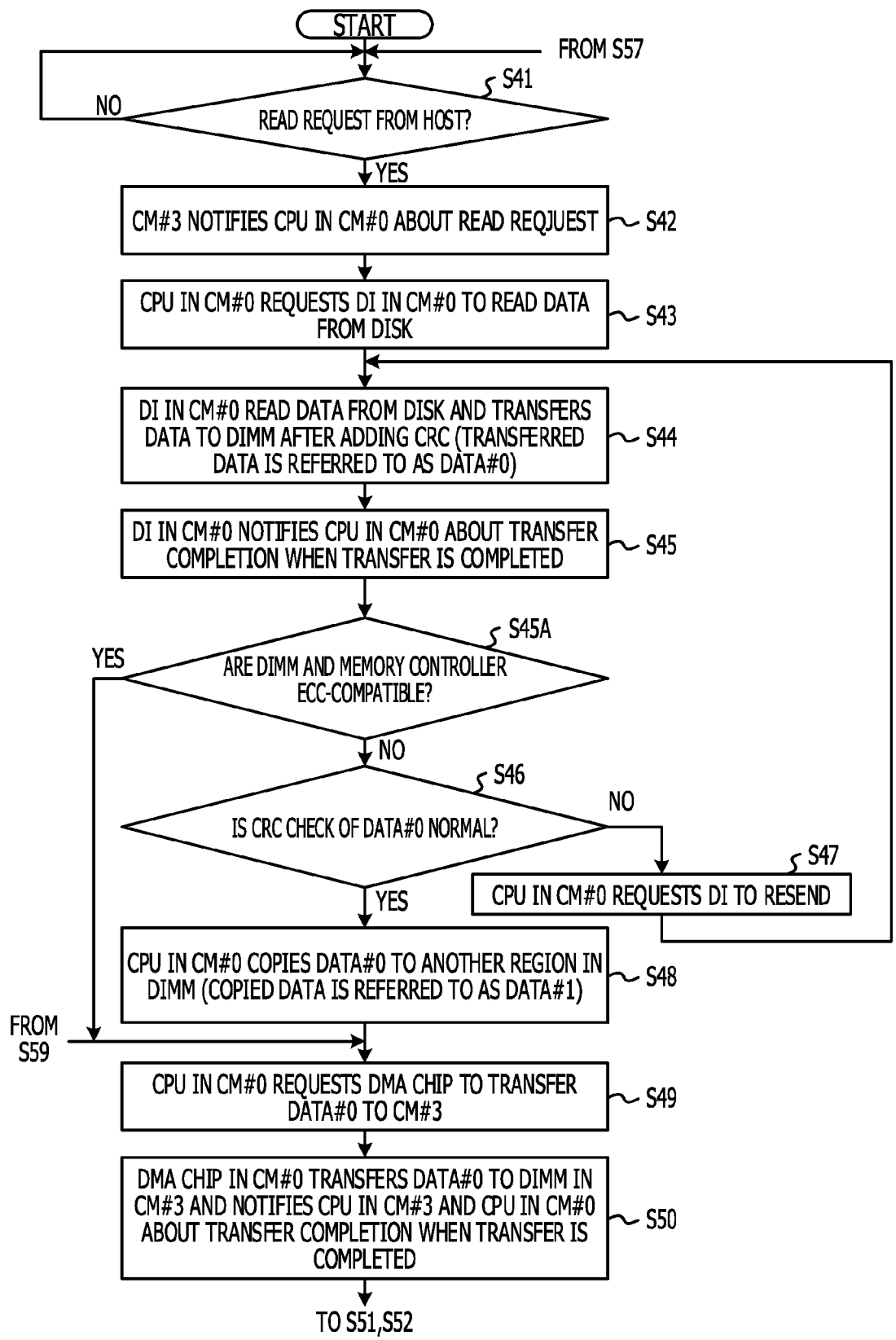
FIG. 6 is a flow chart of reading process by a storage device according to a second embodiment.
Figure 7:
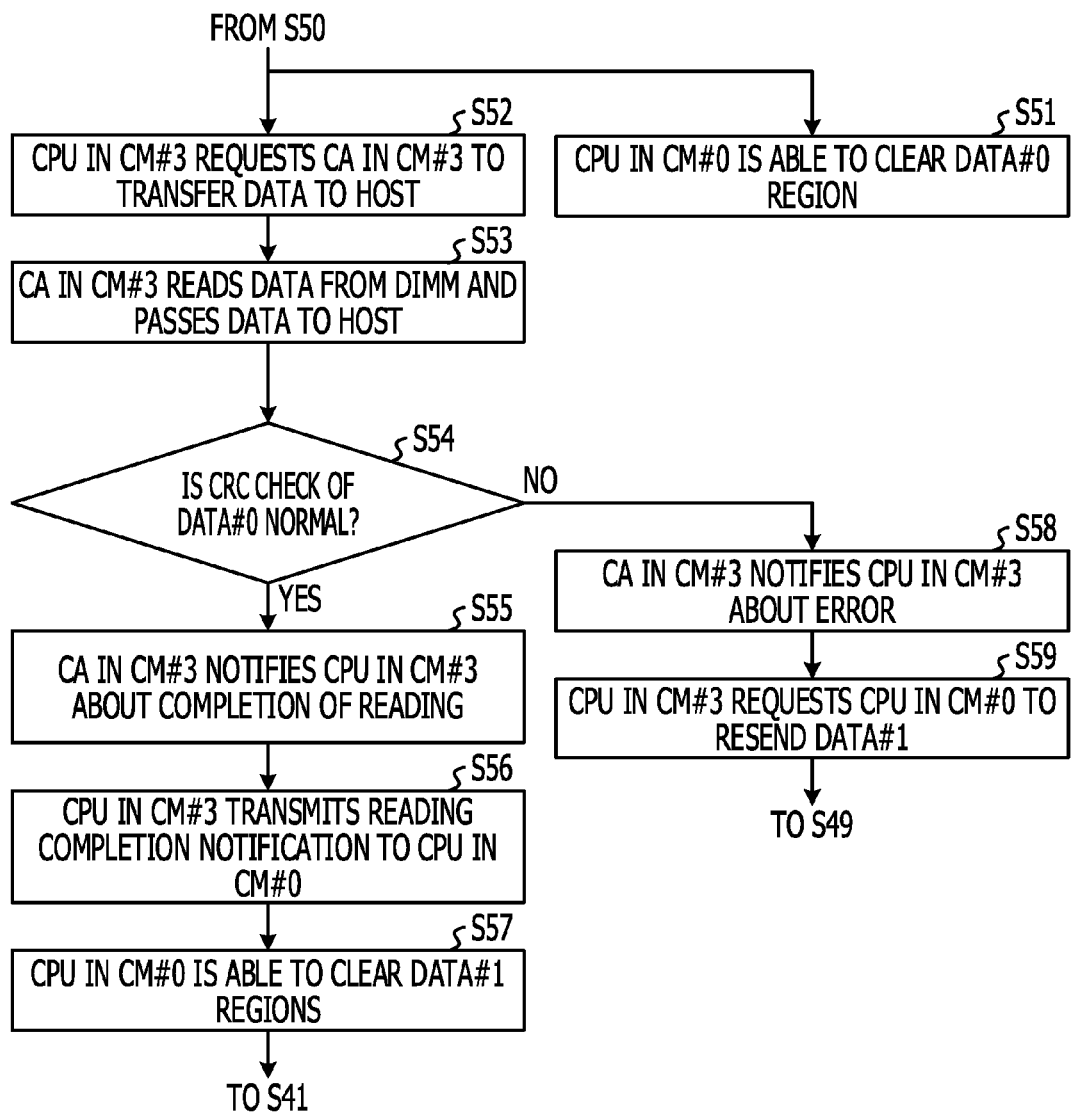
FIG. 7 is a flow chart of reading process by a storage device according to a second embodiment.
Figure 8:
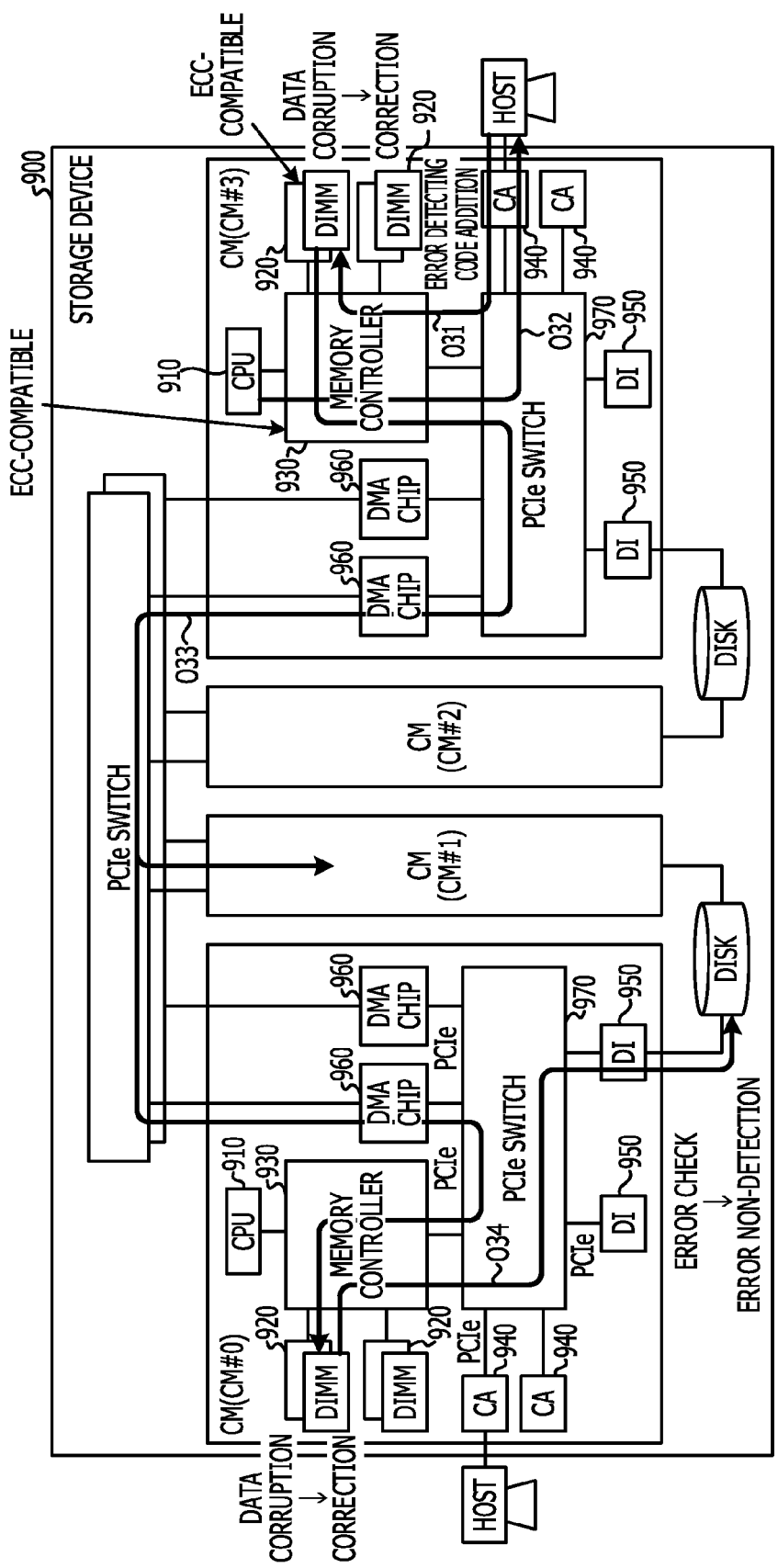
FIG. 8 illustrates a process of writing to a disk when a DIMM is ECC-compatible.
Figure 9:
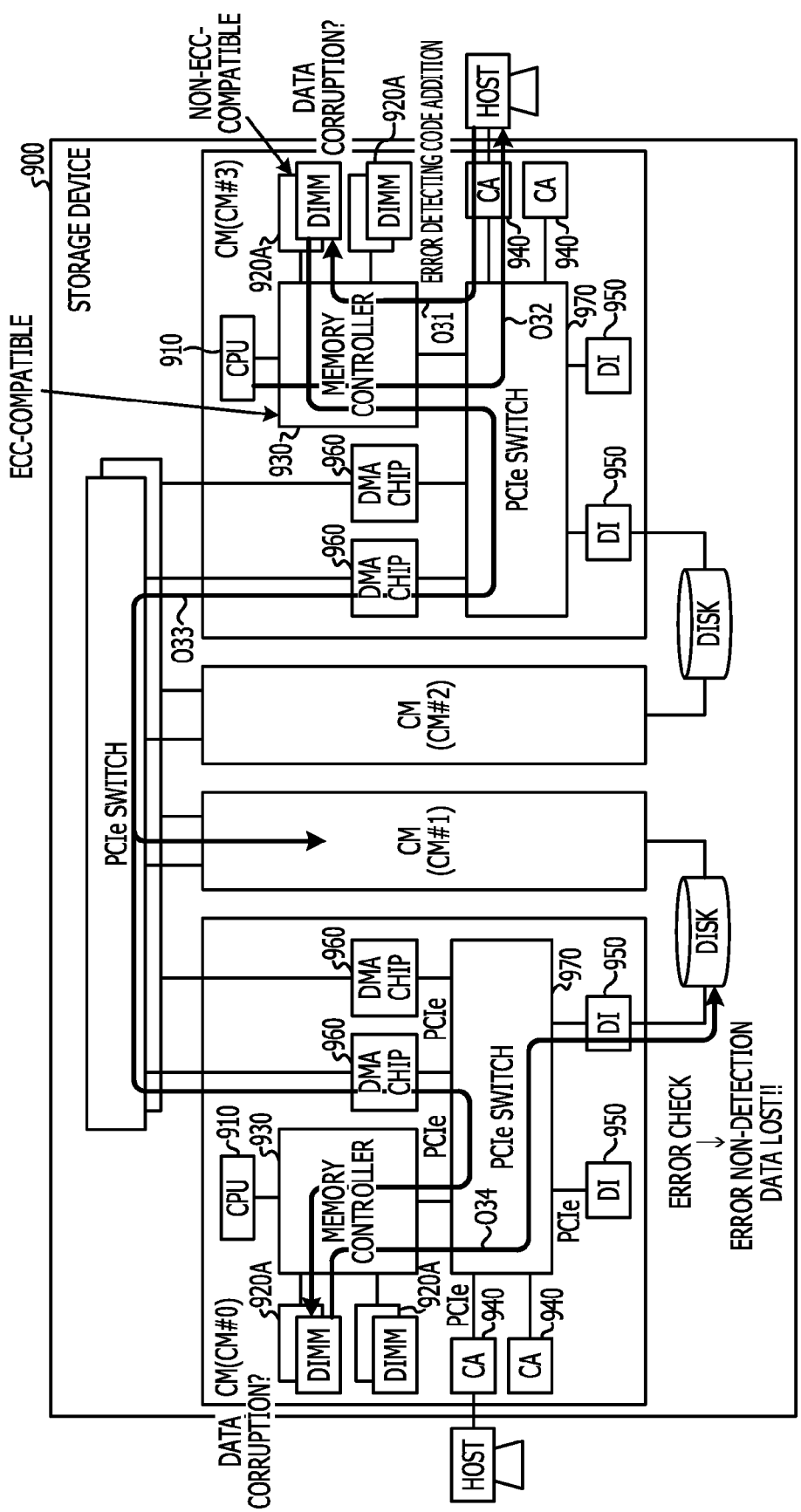
FIG. 9 illustrates a process of writing to a disk when a DIMM is not ECC-compatible.

A flow chart of reading process in the storage device 9B according to the second embodiment will be described with reference to FIGS. 6 and 7. FIGS. 6 and 7 illustrate a flow chart of reading process by the storage device according to the second embodiment. The CM 1 is described as CM#0, the CM 2 is described as CM#1, the CM 3 is described as CM#2, and the CM 4 is described as CM#3 in FIGS. 6 and 7. It is assumed that CM#3 receives from the host 8 a read request to read data from the disk 5 managed by CM#0 and CM#1.

First, a determination is made in CM#3 as to whether a read request has been received from the host 8 (S41). When it is determined that no read request has been received from the host 8 (S41: No), the determination process is repeated until CM#3 receives a read request. When it is determined that a read request from the host 8 has been received (S41: Yes), CM#3 notifies the CPU 14 in CM#0 about the read request (S42).

The CPU 14 in CM#0 requests the DI 17 in CM#0 to read the data from the disk 5 (S43). The DI 17 reads the data from the disk 5 in accordance with the request and transfers the read data to the DIMM 13 (S44). If a CRC has not been added to the read data, the DI 17 adds a CRC to the data before transferring the data to the DIMM 13. For ease of description, the data transferred to the DIMM 13 is referred to as Data#0. The DI 17 then notifies, upon completion of the transfer, the CPU 14 in CM#0 that the transfer has been completed (S45).

The CPU 14 in CM#0 then determines whether the DIMM 13 and the memory controller 12 are ECC-compatible (S45A). For example, the CPU 14 determines whether the DIMM 13 is ECC-compatible using the SPD information. The CPU 14 also determines whether the memory controller 12 is ECC-compatible using the register provided therein. When it is determined that the DIMM 13 and the memory controller 12 are ECC-compatible (S45A: YES), the CPU 14 does not check the CRC and the routine moves to S49. Conversely, when it is determined that one of the DIMM 13 or the memory controller 12 is not ECC-compatible (S45A: No), the routine moves to S46 in which the CPU 14 checks the CRC.

The CPU 14 in CM#0 checks the CRC of Data#0 to determine whether the CRC check is normal (S46). When it is determined that the CRC check is not normal (S46: No), the CPU 14 requests the DI 17 to resend the data (S47). The data may be corrupted for example if the CRC check is not normal. The reading process routine then moves to S44.

When it is determined that the CRC check is normal (S46: Yes), the CPU 14 copies Data#0 to another region of the DIMMs 13 (S48). The copying of the data to another region is conducted to protect data in which data corruption has not been detected. For ease of description, the data transferred to the other region is referred to as Data#1. The CPU 14 requests the DMA chip 16 to transfer Data#0 to CM#3 (S49). The DMA chip 16 transfers Data#0 to the DIMM 43 in CM#3 and notifies, after the completion of the transfer, the CPU 44 in CM#3 and the CPU 14 in CM#0 that the transfer has been completed (S50).

In CM#0, the CPU 14 that received the transfer completion notification is able to clear the region of Data#0 (S51).

In CM#3, the CPU 44 that received the transfer completion notification requests the CA 41 to transfer the transferred Data#0 to the host 8 (S52). The CA 41 then reads Data#0 from the DIMM 43 and passes the read Data#0 to the host 8 (S53).

The CA 41 checks the CRC of Data#0 to determine whether the CRC check is normal (S54). When it is determined that the CRC check is normal (S54: Yes), the CA 41 notifies the CPU 44 that the reading has been completed (S55). The CPU 44 then transmits a reading completion notification to the CPU 14 in CM#0 (S56).

In CM#0, the CPU 14 is able to clear the region of Data#1 upon receiving the reading completion notification from the CPU 44 in CM#3 since the reading according to the read request has been completed (S57). The routine moves to S41 in which the reading process waits for the next read request.

When it is determined in S54 that the CRC check is not normal (S54: No), the CA 41 notifies the CPU 44 in CM#3 about the error (S58). The CPU 44 in CM#3 then requests the CPU 14 in CM#0 to resend the copied Data#1 (S59). The routine moves to S49 and the processing conducted using Data#0 is conducted using Data#1 in place of Data#0.

Effects of Second Embodiment

According to the above second embodiment, in the storage device 9B, upon receiving the data read request from the host 8 through the CM 4, the CM 1 reads data from the disk 5 in accordance with the read request and expands the read data in the DIMM 13 through the memory controller 12. The CM 1 then determines whether an error is detected in the expanded data. The CM 1 saves the data into a region different from the region of the DIMM 13 in which the data was expanded when it is determined that no error in the data has been detected. The CM 1 then transfers the data in which no error has been detected to the CM 4 after saving the read data. According to such a configuration, the storage device 9B saves, into the DIMM 13, the data which has been read in accordance with the read request and has no error. As a result, the storage device 9B is able to improve the speed in reading operation of the host 8 by using the saved data even if an error is detected in the data transferred to the CM 4 due to some reason before replying to the host 8.

Furthermore, according to the above second embodiment, a determination is made in the storage device 9B as to whether an error has been detected in the data when the CM 4 passes, to the host 8, the data transferred from the CM 1. The CM 4 then requests the CM 1 to resend the saved data when it is determined that an error in the data has been detected. When it is determined that no error in the data has been detected, the CM 4 passes the data in which no error has been detected. According to such a configuration, the storage device 9B is able to reliably and quickly respond to the read request by using the saved data for passing the data to the host 8 even if an error is detected in the data in the CM 4.

Other Embodiments

A case has been explained in the first and second embodiments in which the CM 4 receives from the host 8 a write request to write data to the disk 5 managed by another CM. However, without being limited to the above, the CM 4 may receive from the host 8 a write request to write data to the disk 6 managed by the CM 4 itself. In such a case, the CPU 44 copies the data to another region in the DIMM 43 when no data corruption has been detected in the data upon receiving the notification that the data transfer from the CA 41 to the DIMM 43 has been completed. The CPU 44 then transmits a reception completion notification to the host 8. After that, the CPU 44 may request the DI 47 to write the data to the disk 6. As a result, the CM 4 is able to reduce the loss of the data to be written until the completion of the writing to the disk 6 since data without an error is saved into another region of the DIMM 43 even if the DIMM 43 is not ECC-compatible.

A case has been explained in the second embodiment in which the CM 4 receives from the host 8 a read request to read data from the disk 5 managed by another CM. However, without being limited to the above, the CM 4 may receive from the host 8 a read request to read data from the disk 6 managed by the CM 4 itself. In such a case, the CPU 44 requests the DI 47 to read the data from the disk 6 upon receiving the read request from the host 8. The CPU 44 checks the CRC of data upon receiving from the DI 47 notification that the transfer of data to the DIMM 43 has been completed. The CPU 44 copies the data to another region of the DIMMs 43 when data corruption has not been detected in the data, and may request the CA 41 to transfer the data in which data corruption has not been detected to the host 8. As a result, speed in reading operation of the host 8 may be increased by using the saved data even if an error is detected due to some reason in the data transferred to the host 8.

While processing in which data to be written by the CM 1 is received from the host 8 by the CM 4 is described in the first embodiment, the first embodiment is not limited as such and the data to be written by the CM 1 may be received from the host 8 by the CM 1.

Moreover, the storage devices 9, 9A, 9B have been described as devices in which four CMs are rendered redundant with two CMs each in the embodiments. However, the storage devices 9, 9A, 9B are not limited as such and six CMs may be respectively made redundant with a plurality CMs, eight CMs may be respectively made redundant with a plurality CMs, or ten CMs may be respectively made redundant with a plurality CMs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device comprising:
   one or more storages; and
   one or more control devices to control writing data to and reading data from one of the storages, the control devices each including:
   a memory,
   a memory controller to control writing data to and reading data from the memory, and
   a processor to
      determine whether the memory and the memory controller have error correcting functions respectively,
      determine, when at least one of the memory and the memory controller does not have an error correcting function, whether an error is detected in first data expanded in a first memory region of the memory, the first data including an error detecting code, and
      save, when no error in the first data has been detected, the first data into a second memory region of the memory, the second memory region being different from the first memory region.

2. The storage device according to claim 1, wherein
   a first processor in a first control device transfers the first data expanded in a first memory in the first control device to a second memory in a second control device other than the first control device and to a third memory in a third control device that is redundant with the second control device, and
   a second processor in the second control device
      determines whether an error is detected in the first data transferred to the second memory,
      writes to a first storage, when no error has been detected in the first data transferred to the second memory, the first data transferred to the second memory, and
      requests, when an error has been detected in the first data transferred to the second memory, the third control device to write to the first storage the first data transferred to the third memory.

3. The storage device according to claim 2, wherein
   the first control device saves the first data into the first memory, and
   the second processor requests, upon receiving from the third control device a notification of failing in the requested writing, the first control device to transfer the first data saved into the first memory.

4. The storage device according to claim 3, wherein
   the second processor
      determines whether an error is detected in the first data that has been read from the first storage and that has been expanded in a third memory region of the second memory,
      saves, when no error in the first data expanded in the third memory region has been detected, the first data expanded in the third memory region into a fourth memory region of the second memory, the fourth memory region being different from the third memory region, and
      transfers, after completing the saving of the first data into the fourth memory region, the first data expanded in the third memory region to the first control device.

5. The storage device according to claim 4, wherein
   the first processor
      determines whether an error is detected in the first data transferred from the second processor,
      passes to a host, when no error has been detected in the first data transferred from the second processor, the first data transferred from the second processor, and
      requests, when an error has been detected in the first data transferred from the second processor, the second control device to send the first data saved in the fourth memory region.

6. A control device comprising:
   a memory,
   a memory controller to control writing data to and reading data from the memory, and
   a processor to
      determine whether the memory and the memory controller have error correcting functions respectively,
      determine, when at least one of the memory and the memory controller does not have an error correcting function, whether an error is detected in first data expanded in a first memory region of the memory, the first data including an error detecting code, and
      save, when no error in the first data has been detected, the first data into a second memory region of the memory, the second memory region being different from the first memory region.

7. The control device according to claim 6, wherein
   the processor
      determines whether an error is detected in second data expanded in a third memory region of the memory, and saves, when no error in the second data has been detected, the second data into a fourth memory region of the memory, the fourth memory region being different from the third memory region.

8. A data protection method comprising:
determining, by a computer, whether a memory and a memory controller have error correcting functions respectively, the memory controller being for controlling writing data to and reading data from the memory;
determining, when at least one of the memory and the memory controller does not have an error correcting function, whether an error is detected in first data expanded in a first memory region of the memory, the first data including an error detecting code; and
saving, when no error in the first data has been detected, the first data into a second memory region of the memory, the second memory region being different from the first memory region.

* * * * *